United States Patent Office 3,304,349
Patented Feb. 14, 1967

3,304,349
EPIHALOHYDRIN REACTION PRODUCTS OF PHOSPHOROUS AND SULFUR OXYGEN ACIDS AND AMINES
Kwan-Ting Shen, St. Louis, Mo., assignor to Petrolite Corporation, Wilmington, Del., a corporation of Delaware
No Drawing. Filed Dec. 12, 1962, Ser. No. 244,020
2 Claims. (Cl. 260—920)

This invention relates to the reaction products of (1) an epihalohydrin, (2) an anionic compound capable of reacting with the epoxide group of the epihalohydrin, and (3) an amine or an analogous compound thereto, for example sulfur, phosphorous, etc. analogues of an amine. These reaction products will also be referred to herein as "epihalohydrin reaction products."

Probable products may be illustrated by the following:

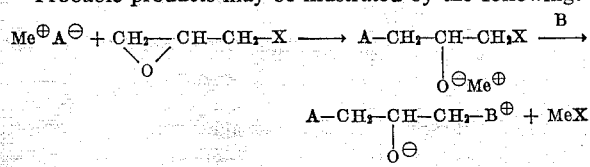

When A⁻ contains an active hydrogen, the above reaction sequence may be written as (in this case A is represented by AH to show formation of OH group):

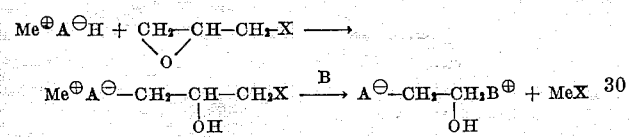

where Me is a cation, for example a metallic ion Na, K, $NH_4$, etc. X is halogen, A is an anionic group and B represents an amine or an analogue thereof, i.e. a cation. As seen above, the epoxy ring opens, and the halogen reacts with the amine.

For convenience these epihalohydrin reaction products may be expressed by the formula:

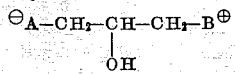

where A is derived from any anionic compound containing a hydrogen atom which is capable of reacting with the epoxide group of the epihalohydrin, for example, a salt of the following:

(1) An acid of sulfur and oxygen, for example, sulfuric, sulfurous acids, etc., hydrosulfuric, hydrosulfuros, etc. acids, and the like.

(2) An acid of phosphoros and oxygen, for example phosphoric, phosphorous, pyrophosphoric, polyphosphoric, etc., acids.

(3) Aminomonocarboxylic acids, for examle of the formula

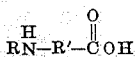

where R is hydrogen or a substituted group, for example alkyl, aryl, aralkyl, alkaryl, etc. R' is alkylene, arylene, alkarylalkylene, etc. R may be for example $$CH_3{-}(CH_2)_n$$

$n=0-20$ or higher,

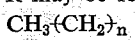

etc.; R' may be ${-}(CH_2)_n{-}$ where $n=1-20$ or higher,

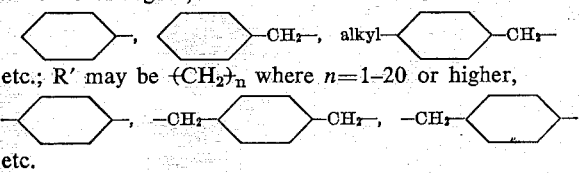

etc.

(4) Amine dicarboxylic acids

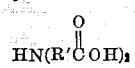

where R' has the same meaning as above, for example,

etc.

(5) Amino sulfur-oxygen acids

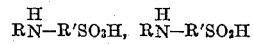

etc. $HN(R'SO_3H)_2$, $HN(R'SO_2H)_2$, $HN(R'SO_4H)_2$, etc. for example $HN[(CH_2)_2SO_4H]_2$,

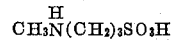

$NH_2(CH_2)_{11}SO_3H$, etc. where R and R' have the same meaning as above.

(6) Hydroxy carboxylic acids (including phenolic acids)

where R=alkylene, arylene, alkarylalkylene, etc., $n=1-6$ or higher, but preferably 1, $m=1-3$ or higher, but preferably 1, for example sugar acids, for example

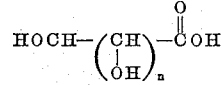

such as saccharic acid, etc.,

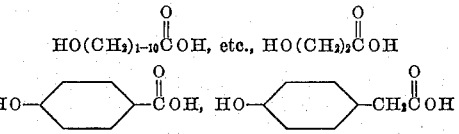

(7) Hydroxy sulfur-oxygen acids (including phenolic acids)

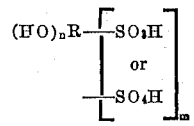

where R, n and m have the same meaning as for the hydroxy carboxylic acids, for example $HO(CH_2)_{1-10}SO_3H$, $HO(CH_2)_{1-10}SO_4H$,

etc.

(8) Sulfur analogues of hydroxy acids, for example $(HS)_nR[SO_3H]_m$, $(HS)_nR[SO_4H]_m$

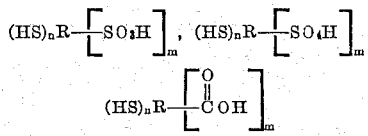

for example $HS(CH_2)_{1-10}SO_3H$, $HS(CH_2)_{1-10}SO_4H$

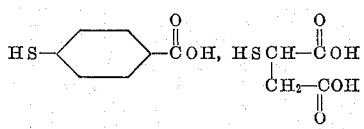

etc.

(9) Miscellaneous anionic materials such as salts of arsenates, borates, tartrates, etc.

B is derived from any amine capable of reacting with the halo group so as to be chemically bonded to the $CH_2{-}$ group including monoamines, polyamines, hydroxylamines, oxyalkylated amines, etc. The amine may be primary, secondary or tertiary, but preferably tertiary. B can also form salts with the anionic moiety of the molecule, for example

The following are examples of amines which can be employed in this invention.

I. MONOAMINES

A. PRIMARY MONOAMINES

These include compounds of the formula R–NH$_2$, where R is a substituted group preferably a hydrocarbon group, for example alkyl, cycloalkyl, aryl, alkenyl, heterocyclic, substituted derivatives of the above, etc.

*Alkyl*

Alkyl includes methyl, ethyl, propyl, butyl, amyl, hexyl, heptyl, octyl, nonyl, decyl, undecyl, dodecyl, tridecyl, tetradecyl, pentadecyl, hexadecyl, heptadecyl, octadecyl, eicosyl, docosyl, etc. having 1–50 or more carbons, such as 1–30, but preferably 1–18 carbons.

The term "alkyl" also includes isomers of the straight chain group wherein branching occurs along the chain, for example

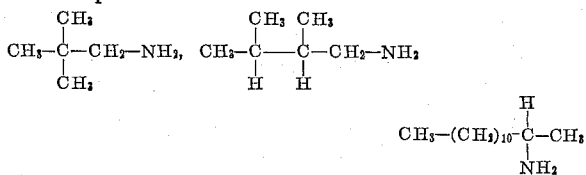

etc.

*Alkenyl and alkinyl*

These include unsaturated analogues of alkyl groups containing one or more —C=C— or —C≡C— groups, for example decenyl, dodecenyl, tridecenyl, tetradecenyl, pentadecenyl, hexadecenyl, heptadecenyl, octadecenyl, etc., dienes for example octadienyl, etc. trienes, for example octatrienyl, etc., alkinyl, for example, butinyl, etc.

*Cycloalkyl*

These include

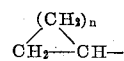

for example cyclobutyl, cyclopentyl, cyclohexyl, cycloheptyl, cyclooctyl, etc.; substituted derivatives thereof, for example alkyl or polyalkyl, for example alkyl cyclohexyl, dialkyl cyclohexyl, etc.

*Aryl*

These include phenyl, substituted phenyl, alkyl phenyl, polyalkylphenyl, chlorophenyl, alkoxyphenyl, etc., naphthyl, alkyl naphthyl, etc.; benzyl, substituted benzyl, etc. groups.

*Heterocyclic*

These include furyl, pyranyl, hydrogenated furyl, pyranyl, etc. groups.

B. SECONDARY AMINES

These include amines of the formula

where R and R', which may or may not be the same, have the same meaning as stated above, for example dimethyl amine, diethyl amine, dipropyl amine, diamylamine, dihexyl amine, dioctyl amine, didodecyl amine, dihexyldecyl amine, etc., methyl ethyl amine, methyl octyl amine, butyl octylamine, methyl octadecyl amine, etc.; methyl octadecenyl amine, dioctadecenyl amine, etc.; dicyclohexyl amine, methyl cyclohexyl amine, etc.; methyl furyl amine, methyl benzyl amine.

C. TERTIARY AMINES

These include amines of the formula

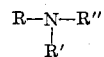

where the R's, which may or may not be the same, have the same meaning as stated above, for example, trimethyl amine, triethyl amine, dimethyl octyl, dimethyl dodecyl, dimethyl tetradecyl, diethyl hexadecyl, methyl ethyl octadecyl, dimethyl octadecyl, etc., dimethyl octadecenyl, diethyl hexadecenyl, etc. dodecyl benzyl methyl, decyl dibenzyl, etc.; dimethyl furyl, etc., dimethyl phenyl, diethyl naphthyl, etc., dicyclohexyl methyl, dimethyl cyclohexyl, etc.

D. COMMERCIAL AMINES

Representative commercial amines are available, for example, these shown in the following table.

The nomenclature of these amines is derived from either their chain length or source of raw material, for example,

| | |
|---|---|
| Armeen 8D | Octyl amine. |
| Armeen C | Coconut oil amine. |
| Armeen S | Soybean oil amine. |
| Armeen T | Tallow amine. |
| Armeen O | Oleyl amine. |
| Armeen HT | Hydrogenated tallow amine. |
| Armeen DMCD | Dimethylhydrogenated coco amine. |
| Armeen M2HT | Dialkylhydrogenated tallow amine. |

Products with "D" designate distilled grade. Products without "D" designate technical grade.

A preferred amine is a di-lower alkyl (<7 carbons) mono-higher alkyl (8 or more carbons, such as 8–20 or more, but preferably 10–18 carbons).

TABLE I

| N-alkyl Chain | Carbon Chain Length | Primary | | | | | | | | | | | | | | | Secondary | | Diamines | | | |
|---|---|---|---|---|---|---|---|---|---|---|---|---|---|---|---|---|---|---|---|---|---|---|
| | | Armeen 8D | Armeen 10D | Armeen 12 | Armeen 12D | Armeen 14D | Armeen 16D | Armeen HT | Armeen HTD | Armeen 18 | Armeen 18D | Armeen T | Armeen TD | Armeen S | Armeen SD | Armeen C | Armeen CD | Armeen 2C | Armeen 2HT | Duomeen C | Duomeen CD | Duomeen S | Duomeen T |
| Hexyl | 6 | 3 | | | | | | | | | | | | | | | | | | | | | |
| Ocyl | 8 | 90 | 4 | | | | | | | | | | | | | 8 | 8 | 8 | | 8 | 8 | | |
| Decyl | 10 | 7 | 90 | 2 | 2 | | | | | | | | | | | 9 | 9 | 9 | | 9 | 9 | | |
| Dodecyl | 12 | | 6 | 95 | 95 | 4 | | | | | | | | | | 47 | 47 | 47 | | 47 | 47 | | |
| Tetradecyl | 14 | | | 3 | 3 | 92 | | 2 | 2 | | 2 | 2 | | | | 18 | 18 | 18 | | 18 | 18 | | 2 |
| Hexadecyl | 16 | | | | | 4 | 92 | 24 | 24 | 6 | 6 | 24 | 24 | 20 | 20 | 8 | 8 | 8 | 24 | 8 | 5 | 20 | 24 |
| Octadecyl | 18 | | | | | | | 7 | 71 | 90 | 90 | 28 | 28 | 17 | 17 | 5 | 5 | 10 | 75 | 5 | 5 | 17 | 28 |
| Octadecenyl | 18 | | | | | | | 1 | 3 | 3 | 4 | 4 | 46 | 46 | 26 | 26 | 5 | 5 | | 1 | 5 | 5 | 26 | 46 |
| Octadecadienyl | 18 | | | | | | | | | | | | | | | | | | | | | | 46 | |
| Mol combining wt | | 135 | 166 | 213 | 195 | 227 | 250 | 300 | 275 | 300 | 280 | 298 | 274 | 297 | 275 | 223 | 208 | 450 | 530 | 321 | 310 | 402 | 400 |
| Percent Primary Amine | | 90 | | 82 | 94 | 92 | 95 | 85 | 95 | 85 | 95 | 85 | 95 | 86 | 95 | 85 | 95 | | | 40 | 44 | 40 | 40 |
| Percent Secondary Amine | | | | | | | | | | | | | | | | | | 85 | 85 | | | | |
| Approx. Melting Pt., °C | | -13 | 8 | 24 | 24 | 29 | 38 | 57 | 55 | 55 | 55 | 46 | 41 | 31 | 22 | 24 | 21 | 46 | 68 | 22 | 20 | 40 | 46 |
| Color, FAC | | 3 | 3 | 9 | 3 | 3 | 3 | 11 | 3 | 11 | 3 | 11 | 3 | 19 | 7 | 11 | 3 | 9 | 5 | 19 | 11 | 13 | 19 |
| Grade [1] | | D | D | T | D | D | D | T | D | T | D | T | D | T | D | T | D | D | D | T | D | T | T |

[1] D—Distilled; T—Technical.

The dimethyl tertiary amines of the above would be represented by a DM prefix. Thus, dimethyl Armeen 8D would be Armeen DM8D and dimethyl Armeen 12 would be Armeen DM12, etc.

TABLE II

| N-Alkyl Chain | Carbon Chain Length | Dimethyl Tertiary Amine | | | | | | | | | | Dialkyl Tertiary Amines | | |
|---|---|---|---|---|---|---|---|---|---|---|---|---|---|---|
| | | Armeen DM16 | Armeen DM16D | Armeen DM18 | Armeen DM18D | Armeen DMC | Armeen DMCD | Armeen DMS | Armeen DMSD | Armeen DMHT | Armeen DMHTD | Armeen M2HT | Armeen M2C | Armeen M2S |
| Hexyl | 6 | | | | | | | | | | | | | |
| Octyl | 8 | | | | | 8 | 8 | | | | | | 8 | |
| Decyl | 10 | | | | | 9 | 9 | | | | | | 9 | |
| Dodecyl | 12 | | | | | 47 | 47 | | | | | | 47 | |
| Tetradecyl | 14 | | | | | 18 | 18 | | | 2 | 2 | 2 | 18 | |
| Hexadecyl | 16 | 92 | 92 | 6 | 6 | 8 | 8 | 20 | 20 | 24 | 24 | 24 | 8 | 20 |
| Octadecyl | 18 | 7 | 7 | 90 | 90 | 5 | 5 | 17 | 17 | 71 | 71 | 71 | 5 | 17 |
| Octadecenyl | 18 | 1 | 1 | 4 | 4 | 5 | 5 | 26 | 26 | 3 | 3 | 3 | 5 | 26 |
| Octadecadienyl | 18 | | | | | | | 37 | 37 | | | | | 37 |
| Mol. weight, theoretical | | 271 | 271 | 295 | 295 | 224 | 224 | 289 | 289 | 289 | 289 | 522 | 389 | 520 |
| Mol. combining weight | | 338 | 295 | 369 | 321 | 280 | 224 | 361 | 314 | 361 | 314 | 564 | 436 | 594 |
| Percent Tertiary Amine | | 80 | 92 | 80 | 92 | 80 | 92 | 80 | 92 | 80 | 92 | | | |
| Approx. Melting Pt., °C | | 15 | 10 | 23 | 20 | −10 | −15 | 0 | −8 | 17 | 15 | 28 | −5 | 9 |
| Color, Gardner, 1933 | | 5 | 1 | 5 | 1 | 5 | 1 | 10 | 1 | 5 | 1 | | | |
| Grade [1] | | T | D | T | D | T | D | T | D | T | D | T | T | T |

[1] D—Distilled, T—Technical.

Other commercial amines include the following: "Primene" amines

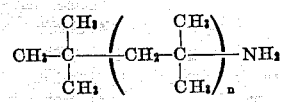

Rosin Amine D

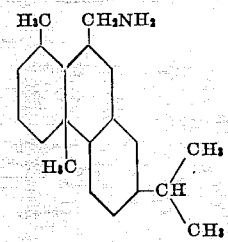

etc.

E. CYCLIC SECONDARY AND TERTIARY AMINES

Also included within the definition of secondary and tertiary amines are those amines where two of the R groups are joined in a cyclic structure such as

Examples of these amines include pyridine, quinoline, isoquinoline, acridine, piperidine, piperazine, morpholine, etc., certain N-substituted derivatives thereof, such as N-alkyl morpholine, N-alkyl piperidine, N-alkyl piperazine, etc. for example N-dodecylmorpholine,
N-octadecylmorpholine,
N-dodecylbenzylpropholine,
N-nonylmethylbenzylmorpholine,
N-cetylpiperidine,
Octylphenoxyethoxyethylmorpholine,
Nonylphenoxyethoxyethylpiperidine,

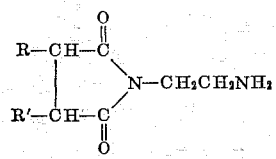

(R and R′=alkyl, alkenyl, hydrogen, etc.)

II. POLYAMINES

These include polyamines corresponding to the formula

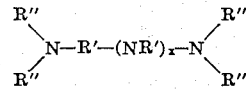

$x=0$ to 8 or greater, in which R″ (which may or may not be the same) is hydrogen, alkyl, cycloalkyl, aryl, or aralkyl and R′ is a divalent radical such as —CH₂CH₂—, —CH₂CH₂CH₂—,

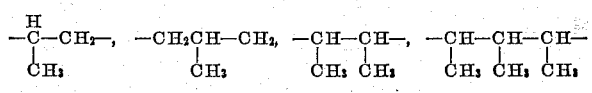

etc.

Ethylenediamine,
Diethylenetriamine,
Triethylenetetramine,
Tetraethylenepentamine,
Propylenediamine,
Dipropylenetriamine,
Tripropylenetetramine,
Butylenediamine,
Aminoethylpropylenediamine,
Aminoethylbutylenediamine,

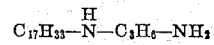

Other polyamines in which the nitrogen atoms are separated by a carbon atom chain having 4 or more carbon atoms include the following: Tetramethylenediamine, pentamethylenediamine, and especially hexamethylenediamine.

Another class of polyamines which may be employed are those sold under the trademark "Duomeen" which is a designation for certain diamines. "Duomeen" amines have the following general formula:

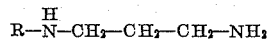

R is an alkyl group derived from a fatty acid or from the mixed fatty acids as obtained from certain oils. The specific "Duomeen" and the source of the radical R are as follows:

(1) "Duomeen" 12, R=lauric,
(2) "Duomeen" C, R=coconut oil fatty acid, (3) Similarly, a comparable diamine, obtained from Rosin Amine D and acrylonitrile, can be prepared.

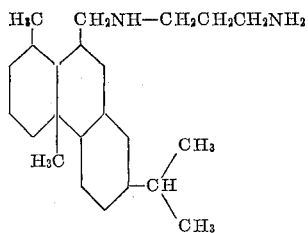

Additional examples of polyamines include the following:

$C_8H_{17}-\overset{H}{N}-CH_2CH_2-NH_2$

N-octyl ethylenediamine $C_{14}H_{29}-\overset{H}{N}-CH_2CH_2-NH_2$

N-tetradecyl ethylenediamine $C_{16}H_{33}-\overset{H}{N}-CH_2-CH_2-NH_2$

N-hexadecylethylenediamine $C_{12}H_{25}-\overset{H}{N}-C_2H_4-\overset{H}{N}-C_2H_4-\overset{H}{N}-C_2H_4-NH_2$ N-dodecyl triethylenetetramine $C_{12}H_{25}-\overset{H}{N}-C_3H_6-NH_2$ N-dodecyl propylenediamine Diamines containing tertiary amino groups for example $C_{12}H_{25}\overset{H}{N}-C_3H_6-\overset{C_2H_5}{\underset{|}{N}}-C_2H_5$ It is to be noted that the above examples show high molal groups, i.e., 8 carbon atoms or more. The same derivatives in which methyl, ethyl, propyl, butyl, amyl, hexyl groups, or the like, appear instead of octyl, decyl, etc., are equally satisfactory.

Acylated polyamines can also be employed, for example:

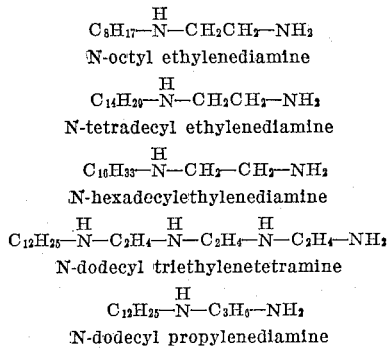

etc.

Although the formula of the epihalohydrin reaction products may be expressed as $^{\ominus}A-CH_2-\underset{\underset{OH}{|}}{CH}-CH_2B^{\oplus}$ compositions containing multiple

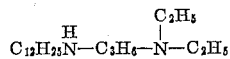

units can also be formed. For example where the anion is $AH_2$ and both H's react, a possible formula is

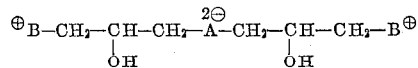

Similarly, where B is a diamine, a possible formula is

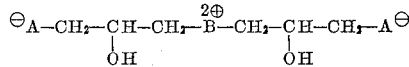

In addition, epihalohydrin reaction products may have plural

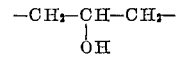

units because of plural active hydrogen associated with $AH_n$ and plural amino groups associated with the polyamines, for example a polymeric structure containing plural units of the following structure

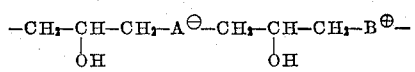

Other structures will be evident to those skilled in the art.

It should be understood that the formulae expressed herein are representations of probable products formed and that other products or mixtures of products can also be formed. Therefore, the products may be best expressed as reaction products of (1) an epihalohydrin, (2) an anionic compound containing a hydrogen atom capable of reacting with the epoxide group of the epihalohydrin, and (3) an amine or an analogous compound thereto, for example, the sulfur, phosphorus, etc., analogues of amines rather than by any specific formula.

Illustrative examples include the following:

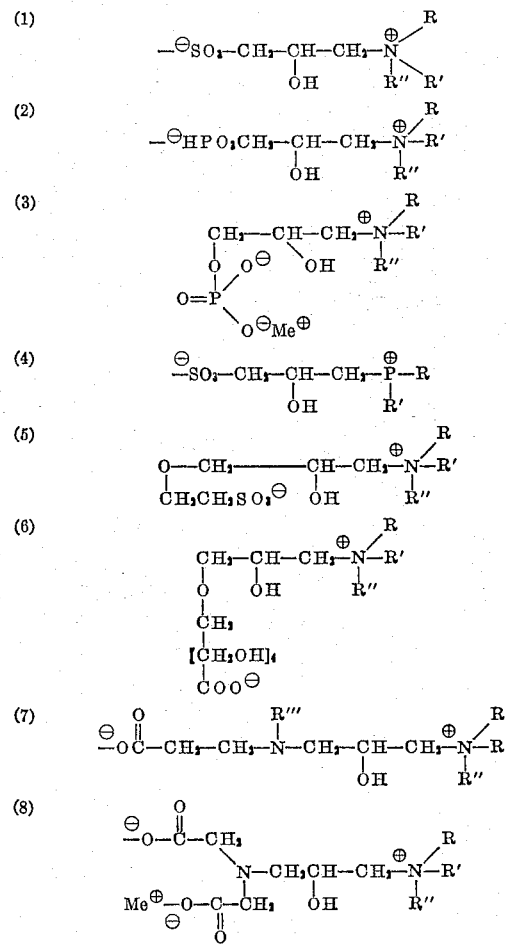

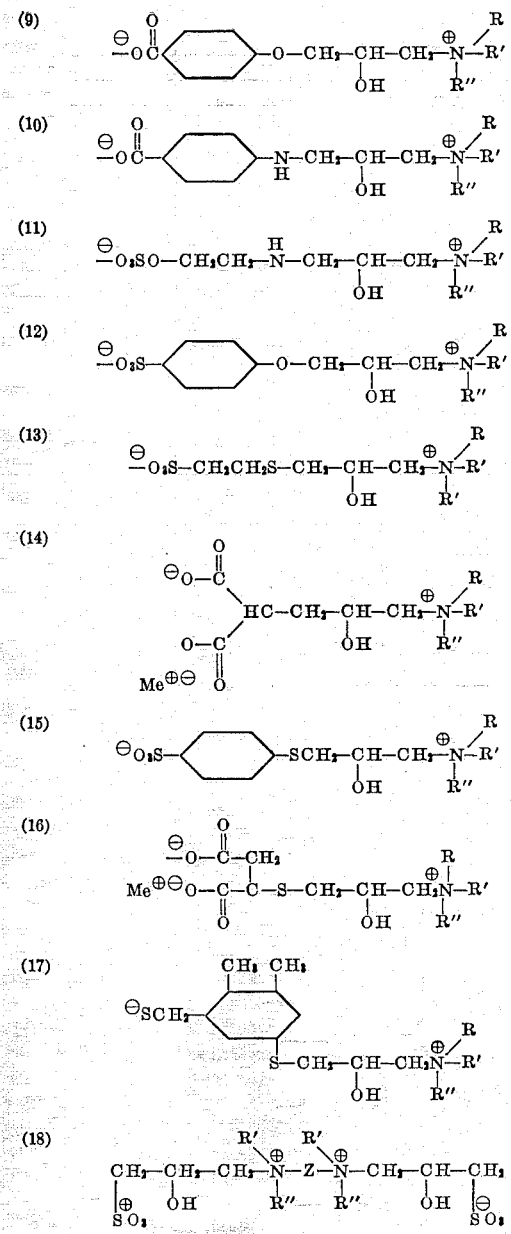

Z is derived from dimeric acid (C₃₆). In the above formulae R, R″, R‴, R″″ are hydrogen or a substituted group such as alkyl.

The reactions are generally carried out as follows: The metal salt of the anionic material is first dissolved in water, by warming if necessary. Epichlorohydrin is added to the clear solution. The reaction mixture is heated until a clear solution is obtained. To clear this solution is then added the amine or an analogous compound. Heating is applied until the reaction mixture becomes clear again. Dry products are obtained by evaporating off the water.

The following examples are presented for purposes of illustration and not of limitation.

Example 1

| | G. |
|---|---|
| Sodium bisulfite (0.1 mole) | 10.4 |
| Water | 41.0 |
| Epichlorohydrin (0.1 mole) | 9.3 |
| Dimethyl dodecylamine (0.1 mole) | 21.3 |

Sodium bisulfite was dissolved in water. Epichlorohydrin was added to the clear solution. The reaction mixture was heated for one hour and became clear at about 80° C. The tertiary amine was added slowly. The turbid mixture was then heated to reflux. The heating lasted about two hours until the reaction mixture became clear.

Example 2

| | G. |
|---|---|
| Sodium bisulfite (0.1 mole) | 10.4 |
| Water | 51.8 |
| Epichlorohydrin (0.1 mole) | 9.3 |
| Octylphenoxyethoxyethyl dimethylamine (0.1 mole) | 32.1 |

The reaction was carried was carried out as in Example 1.

Example 3

| | G. |
|---|---|
| KH₂PO₄ (0.1 mole) | 13.6 |
| Water | 46.3 |
| Epichlorohydrin (0.1 mole) | 9.3 |
| Armeen DMCD (0.1 mole) | 23.4 |

Reaction conditions were the same as in Example 1.

Example 4

| | G. |
|---|---|
| Iminodiacetic acid disodium salt (0.1 mole) | 19.5 |
| Water | 50.1 |
| Epichlorohydrin (0.1 mole) | 9.3 |
| Dimethyl dodecylamine (0.1 mole) | 21.3 |

Epichlorohydrin was added to an aqueous solution of the sodium salt. The mixture was heated for 15 minutes. A clear solution was obtained at about 55° C. The tertiary amine was added. The turbid solution was heated at reflux for 20 hours until it became clear.

Example 5

| | G. |
|---|---|
| Sodium isothionate (0.1 mole) | 14.8 |
| Water | 48.2 |
| Sodium hydroxide | 0.5 |
| Epichlorohydrin (0.1 mole) | 9.3 |
| Armeen DM14D (0.1 mole) | 24.1 |

Sodium isothionate and NaOH were dissolved in water. To this clear solution was added epichlorohydrin with heating. The mixture became clear after about three hours. The final temperature was 96° C. The amine was then added. The reaction mixture was refluxed for one hour to give a clear yellow solution.

Example 6

| | G. |
|---|---|
| Sodium gluconate (0.1 mole) | 21.8 |
| Water | 55.2 |
| NaOH | 0.5 |
| Epichlorohydrin (0.1 mole) | 9.3 |
| Armeen DM14D (0.1 mole) | 24.1 |

Sodium gluconate and NaOH were dissolved in water. To the clear solution was added epichlorohydrin and heat was applied to the mixture which became clear after one hour. The final temperature was about 65° C. The amine was added and heating continued for another hour at reflux. The final product was a brown thick clear solution.

Example 7

| | G. |
|---|---|
| Phosphoric acid (85%) (0.05 mole) | 5.8 |
| Water | 45.0 |
| Epichlorohydrin (0.05 mole) | 4.6 |
| Armeen DM14D (0.15 mole) | 36.2 |

Epichlorohydrin was added to the aqueous solution of phosphoric acid. Heating was applied for 15 minutes. The mixture became clear at 60° C. The amine was added slowly and heating continued for three hours at reflux. The final product was a clear thick solution.

Example 8

|   | G. |
|---|---|
| Sodium N-coco-β-amino propionate (0.1 mole) | 27.2 |
| Water | 84.2 |
| Epichlormohydrin (0.1 mole) | 9.3 |
| Triethylene diamine (0.05 mole) | 5.6 |

Sodium N-coco-β-amino propionate was dissolved in hot water. To the clear solution epichlorohydrin was added drop-wise. The milky solution was then heated for half an hour at reflux. The amine was added and heating continued for one hour. The final product was very thick.

Example 9

|   | G. |
|---|---|
| Sodium bisulfite (0.1 mole) | 10.4 |
| Water | 51.8 |
| Epichlorohydrin (0.1 mole) | 9.3 |
| N,N,N',N'-tetramethyl dimer diamine [1] (0.05 mole) | 32.1 |

[1] General Mills with 36 carbons; amine groups are 18 carbons apart.

Epichlorohydrin was added to the aqueous solution of sodium bisulfite. The mixture was heated to become clear. Amine was added and heating continued at reflux for seven hours. The final product was a clear solution.

In order to prevent repetitive details and since the remaining examples are prepared in a similar manner, they will be presented in tabular form in the following table:

TABLE III.—EPIHALOHYDRIN REACTION PRODUCTS FORMED BY REACTING (I) WITH EPICHLOROHYDRIN AND THEN WITH (II) (EQUIMOLAR AMOUNTS)

| Ex. | Anionic Reactant (I) | Cationic (II) Reactant |
|---|---|---|
| 10 | NaHSO$_3$ | Armeen DM16D. |
| 11 | NaHSO$_3$ | Armeen DM18D. |
| 12 | KH$_2$PO$_4$ | Armeen DM14D. |
| 13 | KH$_2$PO$_4$ | Armeen DM16D. |
| 14 | KH$_2$PO$_4$ | Armeen DM18D. |
| 15 | HN(CH$_2$COONa)$_2$ | Armeen DM14D. |
| 16 | HN(CH$_2$COONa)$_2$ | Armeen DM16D. |
| 17 | HN(CH$_2$COONa)$_2$ | Armeen DM18D. |
| 18 | HN(CH$_2$COONa)$_2$ | C$_{12}$H$_{25}$-CH(CH$_3$-C(=O)-)-C(=O)-NCH$_2$CH$_2$CH$_2$N(CH$_3$)-CH$_3$ |
| 19 | NaHSO$_3$ | C$_{12}$H$_{25}$-CH(CH$_3$-C(=O)-)-C(=O)-NCH$_2$CH$_2$CH$_2$N(CH$_3$)-CH$_3$ |
| 20 | KH$_2$PO$_4$ | C$_{12}$H$_{25}$-CH(CH$_3$-C(=O)-)-C(=O)-NCH$_2$CH$_2$CH$_2$N(CH$_3$)-CH$_3$ |
| 21 | NaHSO$_3$ | (CH$_3$)$_2$NH |
| 22 | NaHSO$_3$ | (CH$_3$)$_2$CH-NH-(CH$_3$) |
| 23 | KH$_2$PO$_4$ | (CH$_3$)$_2$N-CH$_3$ |

TABLE III—Continued

| Ex. | Anionic Reactant (I) | Cationic (II) Reactant |
|---|---|---|
| 24 | $KH_2PO_4$ | $\begin{array}{c} CH_2 \\ \phantom{x}\diagdown \\ \phantom{xx}N{-}C_2H_5 \\ \phantom{x}\diagup \\ CH_2 \end{array}$ |
| 25 | $KH_2PO_4$ | Tetramethyl dimer diamine. |
| 26 | Sodium N-Coco-β-Aminopropionate | $\begin{array}{c} CH_2 \\ \phantom{x}\diagdown \\ \phantom{xx}N{-}CH_3 \\ \phantom{x}\diagup \\ CH_2 \end{array}$ |
| 27 | do | $\begin{array}{c} CH_2 \\ \phantom{x}\diagdown \\ \phantom{xx}NH \\ \phantom{x}\diagup \\ CH_2 \end{array}$ |
| 28 | Sodium N-Coco-β-Aminopropionate | Tris-hydroxymethyl Amino Methane. |
| 29 | do | N-methyl glucamine. |
| 30 | do | $\begin{array}{c} CH_3 \\ \phantom{x}\diagdown \\ \phantom{xx}NCH_2CH_2OCH_2CH_2OH \\ \phantom{x}\diagup \\ CH_3 \end{array}$ |
| 31 | Sodium bitartrate ($NaHC_4H_4O_6 \cdot H_2O$) | Armeen DM12D. |
| 32 | Sodium cellulose sulfate | Armeen DM12D. |
| 33 | do | Armeen DMCD. |
| 34 | do | Armeen DM14D. |

Polyphosphates

One class of anionic compounds capable of reacting with epihalohydrin in accord with this invention are the condensed phosphates. In general, a condensed phosphate embraces a group of pentavalent phosphorous compound in which various numbers of $PO_4$ groups are linked together by oxygen bridges.

The structures of individual phosphoric acids found in polyphosphates include the following:

$$HO-\underset{\underset{OH}{|}}{\overset{\overset{O}{\|}}{P}}-OH$$

Orthophosphoric acid $$HO-\underset{\underset{OH}{|}}{\overset{\overset{O}{\|}}{P}}-O-\underset{\underset{OH}{|}}{\overset{\overset{O}{\|}}{P}}-OH$$

Pyrophosphoric acid $$HO-\underset{\underset{OH}{|}}{\overset{\overset{O}{\|}}{P}}-O-\underset{\underset{OH}{|}}{\overset{\overset{O}{\|}}{P}}-O-\underset{\underset{OH}{|}}{\overset{\overset{O}{\|}}{P}}-OH$$

Tripolyphosphoric acid

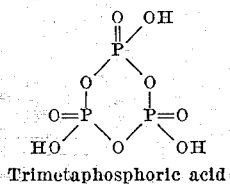

The polyphosphoric acids, for example where $n=2$-tetrapolyphosphoric acid, where $n=3$-pentapolyphosphoric acid, etc.

These include the cyclic, linear, and cross-linked structure for example:

(1) Phosphates having ring-like anions such as found in the meta phosphates, for example

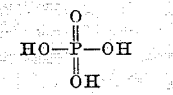

Trimetaphosphoric acid

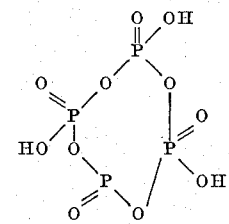

Tetrametaphosphoric acid

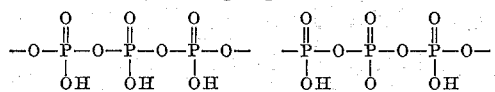

Linear meta and polyphosphates

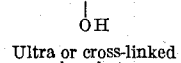

Ultra or cross-linked phosphates

All three groups come under the heading of condensed phosphate for the simplest method for their preparation is still by condensation reactions by elimination of water

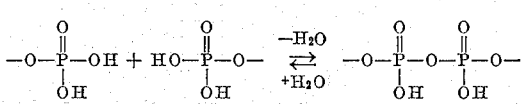

It is also common to condensed phosphates that, on appropriate treatment with water, they are hydrolytically broken down to ortho- or mono-phosphates, usually by a series of intermediate reactions.

All phosphates can be represented stoichiometrically as combinations of oxides. Thus, $Na_2HPO_4$ can be written as $2Na_2O \cdot H_2O \cdot P_2O_5$ and $Na_5P_3O_{10}$ as $5NaO \cdot 3P_2O_5$. The ratio (R) of cationic oxides (such as $Na_2O$ and $CaO$ and including $H_2O$ of composition) to anionic oxides ($P_2O_5$) determines the type of phosphate. If the mole ratio of cationic to anionic oxide, for example $(NaO+H_2O+CaO)/P_2O_5$ is 3, the substance is an orthophosphate. If it lies between 1 and 2, the substance is a polyphosphate and in a pyrophosphate (dipolyphosphate) the ratio is exactly 2. A ratio of exact unity gives a metaphosphate. If the ratio lies between 0 and unity, the substance is an ultra or cross-linked phosphate. This relationship is illustrated in the following table:

Although salts are employed, these contain sufficient active hydrogen due to hydrolysis to react with the epox-

TABLE IV.—CLASSIFICATION OF PHOSPHATES

| Oxide ratio, R [a] | Name | General formula of Normal Sodium Salt | Structures |
|---|---|---|---|
| Condensed: | | | |
| 0 | Phosphorus pentoxide | $(P_2O_5)_n$ | $P_4O_{10}$ molecules or continuous structures. |
| Between 0 and 1 | Ultraphosphates | $(xNa_2O)P_2O_5$ for $P<x<1$ | Interconnected chains and/or rings. |
| 1 | Metaphosphates | $Na_n(PO_3)_n (n=3, 4, \ldots)$ | Rings (or extremely long chains). |
| Between 1 and 2 | Polyphosphates | $Na_{n+2}P_nO_{3n+1} (n=2, 3, 4, 5, \ldots)$ | Chains. |
| 2 | Pyrophosphate | $Na_4P_2O_7$ | Two phosphorous atoms. |
| Between 2 and 3 | Mixtures of pyro- and ortho-phosphates | | |
| Simple Structures: | | | |
| 3 | Orthophosphate | $Na_3PO_4$ | One phosphorous atom. |
| >3 | Orthophosphate plus metal oxide (including double salts and solid solutions). | | |

[a] $(Na_2O+H_2O_{compn.}+CaO+\ldots)/P_2O_5$.

Analogous compound within the scope of this invention can also be prepared by condensed arsenates and condensed arsenate phosphates

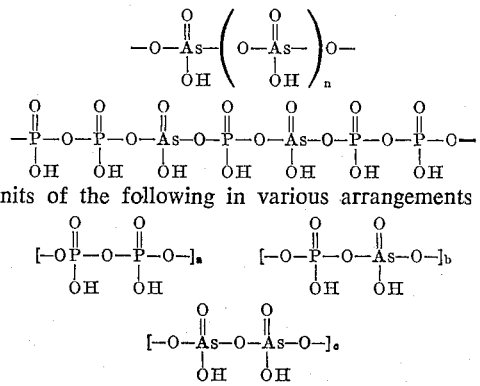

Units of the following in various arrangements

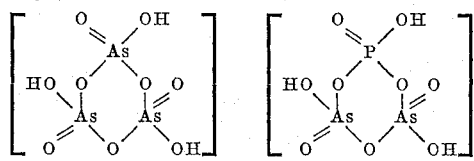

etc.

Meta arsenate-phosphates in variations of the following units

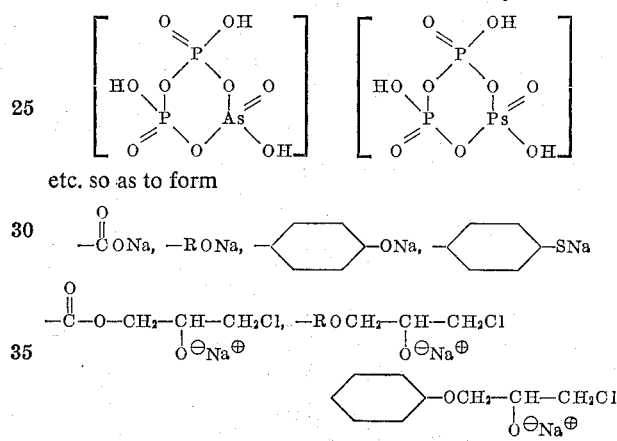

and the like.

In addition to polyphosphates, polyarsenates, etc., one may employ in an analogous manner polyborates and poly compounds containing mixed units of those stated above.

ide group, i.e. the active hydrogens may be formed in situ. In addition, the epoxide group of the epihalohydrin can react with salts such as salts of carboxylic acids etc. so as to form $$-\overset{O}{\underset{}{C}}ONa, \quad -RONa, \quad -\langle\bigcirc\rangle-ONa, \quad -\langle\bigcirc\rangle-SNa$$

$$-\overset{O}{\underset{}{C}}-O-CH_2-CH-CH_2Cl, \quad -ROCH_2-CH-CH_2Cl$$
$$\qquad\qquad\quad \overset{|}{O^\ominus Na^\oplus} \qquad\qquad\qquad \overset{|}{O^\ominus Na^\oplus}$$

$$\langle\bigcirc\rangle-OCH_2-CH-CH_2Cl$$
$$\qquad\qquad \overset{|}{O^\ominus Na^\oplus}$$

etc. groups.

Esters of polybasic inorganic acids and hydroxylated materials, particularly polyols and their metal salts can also be reacted as anionic materials according to this invention. Examples of polybasic inorganic acids include sulfuric acid, phosphoric acid, arsenic acid, etc. Examples of polyols include glycols, glycerols, sugar alcohols, cellulose, oxyalkylated polyols, oxyalkylated phenol-formaldehyde resins, etc.

The reactions were carried out in the same way as described above. Examples were presented in the following table:

TABLE V.—PRODUCTS FORMED BY REACTING (I) WITH ONE MOLE OF EPICHLOROHYDRIN AND THEN WITH (II)

| Ex. | Anion (I) | Moles | Cationic Reactant (II) | Moles |
|---|---|---|---|---|
| 1 | $Na_4P_2O_7$ (Tetrasodium pyrophosphate) | 1 | Armeen DM12D | 1 |
| 2 | $Na_5P_3O_{10}$ (Sodium tripolyphosphate) | 0.5 | do | 1 |
| 3 | $Na_8P_6O_{19}$ (Oilfos) | 0.2 | do | 1 |
| 4 | $Na_{16}P_{14}O_{43}$ (Sodium hexametaphosphate) | 0.1 | do | 1 |
| 5 | $Na_2B_4O_7 \cdot 10H_2O$ (Borax) | 1 | do | 1 |
| 6 | $Na_{16}P_{14}O_{43}$ | 0.1 | $\begin{array}{c} CH_3 \\ | \\ CH-CH_2 \quad CH_3 \\ \diagdown \quad / \quad | \\ N \quad N-CH_2-CH-NH_2 \\ \diagup\diagdown \quad \diagup \\ C \\ | \\ C_{13}H_{27} \end{array}$ | 1 |
| 7 | $Na_{16}P_{14}O_{43}$ | 0.1 | Armeen DM14D | 1 |
| 8 | $Na_{16}P_{14}O_{43}$ | 0.1 | $\begin{array}{c} CH_2-CH_2 \\ \diagdown \quad / \\ N \quad N-CH_2CH_2NH_2 \\ \diagup\diagdown \quad \diagup \\ C \\ | \\ C_{17}H_{33} \end{array}$ | 1 |
| 9 | $Na_8P_6O_{19}$ | 0.2 | Armeen DM14D | 1 |
| 10 | $Na_8P_6O_{19}$ | 0.2 | $C_{12}H_{25}NHCH_2CH_2NH_2$ | 1 |
| 11 | $Na_{16}P_{14}O_{43}$ | 0.2 | $C_{12}H_{25}NHCH_2CH_2NH_2$ | 1 |
| 12 | $Na_{16}P_{14}O_{43}$ | 0.2 | $C_{18}H_{35}NH_2$ | 1 |
| 13 | $Na_2B_4O_7 \cdot 10H_2O$ | 1 | $C_{18}H_{35}NH_2$ | 1 |

The ratio of polyphosphates, etc. to epichlorohydrin can vary from one to one to one to $n$, where $n$=number or potassium atoms in the molecule.

Oxyalkylation

Since the epihalohydrin reaction products of this invention contain hydroxy groups, they can be oxyalkylated in any suitable manner with any suitable $\alpha,\beta$-alkylene oxide, for example, alkylene oxides of the formula:

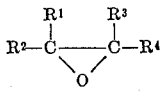

where $R^1$, $R^2$, $R^3$, $R^4$ are hydrogen or a substituted group, such as alkyl, cycloalkyl, aryl, etc., for example ethylene oxide, propylene oxide, butylene oxide, amylene oxide, octylene oxide, styrene oxide, methylstyrene oxide, cyclohexene oxide (where $R^1$ and $R^3$ are joined to form a ring), etc. The polyoxyalkylene group is represented by $(OA)_n$ when $n$ represents the number of oxide units and A is the group $$-\underset{\underset{R^2}{|}}{\overset{\overset{R^1}{|}}{C}}-\underset{\underset{R^4}{|}}{\overset{\overset{R^3}{|}}{C}}-O-$$

Equivalents of alkylene oxides can also be employed, for example alkylene carbonates, i.e. ethylene carbonate, propylene carbonate, butylene carbonate, etc. In addition alkylene oxides of the glycide, methyl glycide, etc. type and their equivalents can also be employed.

Furthermore, $-(AO)_n-$ denotes (1) homo units for example $-(EtO)_n-$, $-(PrO)_n-$, $-(BuO)_n-$, $-(Octyl\ O)_n-$,

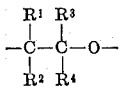

etc., (2) block units, $-(EtO)_a-(PrO)_b-$, $-(EtO)_a-(BuO)_b-$
$-(PrO)_a-(EtO)_b-(PrO)_c-$
$-(EtO)_a-(PrO)_b-(BuO)_c-$

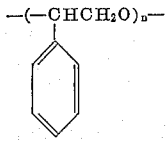

etc. where $a+b+c=n$; (3) heteric units containing random mixtures of more than one oxide $-(EtO-PrO)_n-$, $-(PrO-BuO)_n-$, $-(EtO-BuO)_n-$, wherein the ratio of each oxide to the other is for example 1–99 to 99–1; (4) heteric-homo block units for example $-(EtO)_a-(EtO-PrO)_b-$
$-(EtO)_a-(PrO)_b-(EtO-PrO)_c-$
$-(EtO-PrO)_a-(BuO)_b-$, etc. where $-EtO-$, $-PrO-$, $-BuO-$ are units derived from ethylene, propylene, and butylene oxides respectively.

$-(OA)_n-$ can also be derived from an oxetane (e.g., $\alpha,\gamma$-alkylene oxides), for example those of the formula

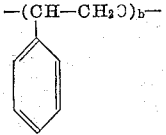

where E and D are hydrogen or a substituted radical, for example alkyl, aryl, cycloalkyl, alkenyl, aralkyl, etc.

In addition E and D can be substituted, such as where the oxetane is derived from pentaerythritol and derivatives thereof. Examples of such oxetanes can be found in the American Chemical Society Monogram "The Pentaerythritols" by Berlow et al. (Reinhold 1958), chapter X.

Preferred embodiments of such pentaerythritol derived oxetanes include those of the formula

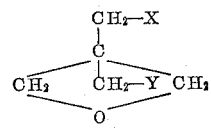

where X and Y are halogen, cyano, hydroxy and alkoxy.

Since the products of this invention may be block polymers containing blocks or segments of alkylene oxide units which are added sequentially, oxyalkylation is in essence a step-wise procedure. For the sake of simplicity of presentation, the invention will be illustrated by employing as a base oxyalkylatable epihalohydrin reaction product $Q(OH)_q$ and by employing only ethylene, propylene, and butylene oxides with the understanding that other hydrophobe oxides (i.e. other than ethylene oxide) can be used in place of propylene and butylene oxides such as amylene oxide, octylene oxide, styrene oxide, oxetanes, etc. These are shown in the following Table where $Q(OH)_q$ is the epihalohydrin reaction product having $q$OH groups.

TABLE VI

Step I (1) $Q[OEtO)_aH]_q$
(2) $Q[O(PrO)_aH]_q$
(3) $Q[OBuO)_aH]_q$
(4) $Q[OMO)_aH]_q$
(5) $Q[O(PrO-BuO)_aH]_q$ (MO=mixture of EtO—PrO for example 1:1, 3:2, 2:3, etc. molar ratio)

Step II

Reaction of the Step I product with one of the five oxides or mixtures employed in Step I, which oxide had not been reacted in the immediately preceding step, to give for example:

(6) $Q[O(EtO)_a(PrO)_bH]_q$
(7) $Q[O(EtO)_a(BuO)_bH]_q$
(8) $Q[O(EtO)_a(MO_bH]_q$
(9) $Q[O(EtO)_a(PrO-BuO)_bH]_q$
(10) $Q[O(PrO)_a(EtO)_bH]_q$
(11) $Q[O(PrO)_a(BuO)_bH]_q$
(12) $Q[O(PrO)_a(MO)_bH]_q$
(13) $Q[O(PrO)_a(PrO-BuO)_bH]_q$
(14) $Q[O(BuO)_a(EtO_bH]_q$
(15) $Q[O(BuO)_a(PrO)_bH]_q$
(16) $Q[O(BuO_a(MO_bH]_q$
(17) $Q[O(BuO)_a(PrO-BuO)_bH]_q$
(18) $Q[O(MO)_a(EtO)_bH]_q$
(19) $Q[O(MO)_a(PrO)_bH]_q$
(20) $Q[O(MO)_a(BuO)_bH]_q$
(21) $Q[O(MO)_a(PrO-BuO)_bH]_q$
(22) $Q[O(PrO-BuO)_a(EtO)_bH]_q$
(23) $Q[O(PrO-BuO)_a(PrO)_bH]_q$
(24) $Q[O(PrO-BuO)_a(BuO)_bH]_q$
(25) $Q[O(PrO-BuO)_a(MO)_bH]_q$

Step III

The products of Step II can be reacted with one of the five epoxides or mixture of oxides which had not been reacted in the immediately preceding step, i.e. either EtO, PrO, BuO, MO, or PrO—BuO, with the above exclusion as to the epoxide just reacted. This will be illustrated as follows:

(26) $Q[O(EtO)_a(PrO)_b(EtO)_cH]_q$
(27) $Q[O(EtO)_a(PrO)_b(BuO)_cH]_q$
(28) $Q[O(EtO)_a(PrO)_b(MO)_cH]_q$
(29) $Q[O(EtO)_a(PrO)_b(PrO-BuO)_cH]_q$
(30) $Q[O(EtO)_a(BuO)_b(EtO)_cH]_q$
(31) $Q[O(EtO)_a(BuO)_b(PrO)_cH]_q$
(32) $Q[O(EtO)_a(BuO)_b(MO)_cH]_q$
(33) $Q[O(EtO)_a(BuO)_b(PrO-BuO_cH]_q$

(34) Q[O(EtO)ₐ(MO)ᵦ(EtO)꜀H]_q
(35) Q[O(EtO)ₐ(MO)ᵦ(PrO)꜀H]_q
(36) Q[O(EtO)ₐ(MO)ᵦ(BuO꜀H]_q
(37) Q[O(EtO)ₐ(MO)ᵦ(PrO—BuO)꜀H]_q
(38) Q[O(EtO)ₐ(PrO—BuO)ᵦ(EtO)꜀H]_q
(39) Q[O(EtO)ₐ(PrO—BuO)ᵦ(PrO)꜀H]_q
(40) Q[O(EtO)ₐ(PrO—BuO)ᵦ(BuO)꜀H]_q
(41) Q[O(EtO)ₐ(PrO—BuO)ᵦ(MO)꜀H]_q
(42) Q[O(PrO)ₐ(EtO)ᵦ(PrO)꜀H]_q
(43) Q[O(PrO)ₐ(EtO)ᵦ(BuO)꜀H]_q
(44) Q[O(PrO)ₐ(EtO)ᵦ(MO)꜀H]_q
(45) Q[O(PrO)ₐ(EtO)ᵦ(PrO—BuO)꜀H]_q
(46) Q[O(PrO)ₐ(BuO)ᵦ(EtO)꜀H]_q
(47) Q[O(PrO)ₐ(BuO)ᵦ(PrO꜀H]_q
(48) Q[O(PrO)ₐ(BuO)ᵦ(MO)꜀H]_q
(49) Q[O(PrO)ₐ(BuO)ᵦ(PrO)—BuO)꜀H]_q
(50) Q[O(PrO)ₐ(MO)ᵦ(EtO)꜀H]_q
(51) Q[O(PrO)ₐ(MO)ᵦ(PrO)꜀H]_q
(52) Q[O(PrO)ₐ(MO)ᵦ(BuO)꜀H]_q
(53) Q[O(PrO)ₐ(MO)ᵦ(PrO—BuO)꜀H]_q
(54) Q[O(PrO)ₐ(PrO—BuO)ᵦ(EtO)꜀H]_q
(55) Q[O(PrO)ₐ(PrO—BuO)ᵦ(PrO)꜀H]_q
(56) Q[O(PrO)ₐ(PrO—BuO)ᵦ(BuO)꜀H]_q
(57) Q[O(PrO)ₐ(PrO—BuO)ᵦ(MO)꜀H]_q
(58) Q[O(BuO)ₐ(EtO)ᵦ(PrO)꜀H]_q
(59) Q[O(BuO)ₐ(EtO)ᵦ(BuO)꜀H]_q
(60) Q[O(BuO)ₐ(EtO)ᵦ(MO)꜀H]_q

Step IV involves the oxyalkylation of the products of Step III. Step V involves the oxyalkylation of Step IV. Further oxyalkylations involve Steps VI–X or higher. This process can be continued ad infinitum.

Depending on the particular application, one may combine a large or small amount of alkylene oxide. Thus, one may combine the alkylene oxide to the epihalohydrin reaction product in mole ratios of 1:1 or less to 1000:1 or more such as 1–100, for example 1–50, but preferably 1–20. However, it should be understood that the preferred ratio will vary as to the particular application, the particular alkylene oxide, the particular ratios of the oxide, etc.

Sulfur analogues of the alkylene oxides can also be employed. Thus, Q(OH)_q can be oxyalkylated with alkylene oxide, alkylene sulfide, or mixtures of alkylene oxides and alkylene sulfide in a random or block-wise fashion. The following compounds are exemplary:

Q[—O—(CH₂—CH₂S)ₐ—H]_q

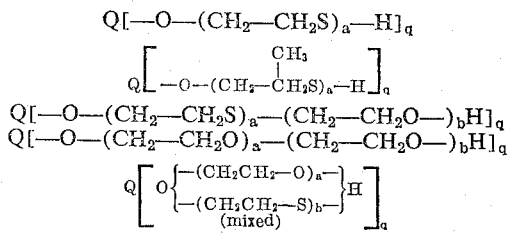

Q[—O—(CH₂—CH₂S)ₐ—(CH₂—CH₂O—)ᵦH]_q
Q[—O—(CH₂—CH₂O)ₐ—(CH₂—CH₂O—)ᵦH]_q

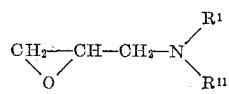

Since the products of this invention have terminal hydroxyl groups, these groups can be further reacted with any compound capable of reacting therewith.

Examples of such compounds include the following:
(1) Polyepoxides.
(2) Glycidyl compounds, such as unsaturated glycidyl ethers, for example glycidyl allyl ether, glycidyl hydrocarbon ethers, for example glycidyl isopropyl ether, glycidyl phenyl ether, etc., glycidyl amine such as glycidyl dialkyl amino methane of the formula $$CH_2—CH—CH_2—N\diagdown_{R^{11}}^{R^1}$$
 \diagdown O \diagup when R+R¹¹ are alkyl groups, etc.
(3) Alkylene imines such as ethylene imine, propyleneimine, higher alkyleneimines.
(4) Alcohols or other equivalent, such as alkyl sulfate, alkyl halides, etc. to form ethers.

(5) Esters prepared from monocarboxyl acid as acetic, benzoic, etc., acid, for example an acid of the formula

where Z comprises a saturated or unsaturated alkyl radical, a cycloalkyl radical or an aromatic radical. The polycarboxyl esters may be full esters or fractional esters, i.e. where the free carboxylic acid group is present in the molecule.

Polycarboxylic acid can advantageously be employed and its structure can be varied widely. In general, they can be expressed as

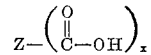

where Z comprises a saturated or unsaturated aliphatic radical, acycloaliphatic radical, an aromatic radical, and the like, and x is a whole number equal to 2 or more, for example, 2–4, but preferably 2.

Examples of the polycarboxylic acids comprise those of the aliphatic series, for example, oxalic, malonic, succinic, glutaric, adipic, pimelic, suberic, azelaic, sebacic, nonanedicarboxylic acid, decanedicarboxylic acids, undecanedicarboxylic acids, and the like.

Examples of unsaturated aliphatic polycarboxylic acids comprise fumaric, maleic, mesaconic, citraconic, itaconic, muconic, aconitic acids, and the like.

Examples of aromatic polycarboxylic acids comprise phthalic, isophthalic acids, terephthalic acids, substituted derivatives thereof (e.g. alkyl, chloro, alkoxy, etc. derivatives), biphenyldicarboxylic acid, diphenylether dicarboxylic acids, diphenylsulfone dicarboxylic acids and the like.

Higher aromatic polycarboxylic acids containing more than two carboxylic groups comprise hemimellitic, trimellitic, trimesic, mellophanic, prehnitic, pyromellitic acids, mellitic acid, and the like.

Other polycarboxylic acids comprise the dimeric, trimeric and other polyacids, for example, dilinoleic acid, trilinoleic acid, polylinoleic acid, and the like such as those prepared by Emery Industries. Other polycarboxylic acids comprise those containing ether groups, for example, diglycolic acid. Mixtures of the above acids can be advantageously employed.

In addition, acid precursors such as esters, anhydrides, glycerides, etc. can be employed in place of the free acid.

In summary, the products of this invention include the reaction products of (1) an epihalohydrin, (2) an anionic compound capable of reaction with the epoxide group of the epihalohydrin, and (3) an amine or analogous compound thereof. These products are best expressed by the process of manufacture since the reaction products may form many possible reaction products. For example with an amino acid

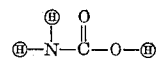

each of the encircled H's could react with the epoxide group or the sodium salt of the amino acid,

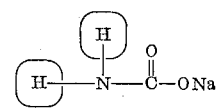

could react with the halogen atom of the epihalohydrin. Thus, mixtures are probably formed in all reactions. One possible product has a dipolar structure.

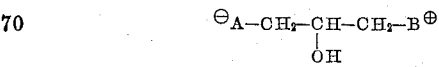

and the like. A preferred embodiment is to employ a polyphosphate salt as the anionic material. The preferred amino reactant is a tertiary amine.

Equivalents may also be employed. For example

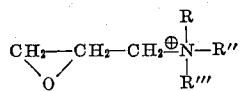

may be reacted with the anionic material. Since epihalohydrin reaction products contain an OH group, they can be reacted at this position by oxyalkylation, acylation, etc. or by any other reactant capable of reacting with an OH group. Analogues and closely related compounds can also be employed for example,

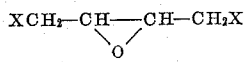

so as to form compounds of the type

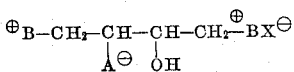

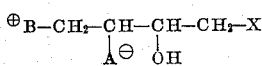

etc., as well as employing sulfur, phosphorus, etc. analogues of amines.

Uses

The compositions of this invention may be employed as follows:

(1) As surfactants, detergents, dispersants, wetting agents, etc.

(2) As cleaning agents for (1) soft surfaces such as textiles, cotton, wool, rayon, synthetic fibers, etc. and (2) hard surfaces such as metal, glass, ceramic, painted, plastic, linoleum, etc. surfaces.

(3) In textile industries in such operation as (a) Dyeing, for example in dye levelling,
(b) Wetting
(c) Emulsifying
(d) Lubrication to facilitate spinning, weaving, and knitting.

(4) In dry cleaning, for example, to remove water soluble materials.

(5) In flotation and benefication of ores, for examples as collectors and/or promotors.

(6) In electroplating and the suface finishing of metals.

(7) As cutting and fabricating lubricants, for example, in cutting oils, drawing and rolling lubricants, etc.

(8) In asphalts, for example as anti-stripping agents, in asphalt emulsions, etc.

(9) In cement and concrete, for example to improve the plasticity, workability and fluidity of concrete slurries, to improve free-thaw resistance, to waterproofing concrete and masonry, as air entraining agents, etc.

(10) In agricultural uses, for example to reduce caking, to prepare emulsions of insecticides, fungicides, herbicides, etc.

(11) In processing leather and furs in salting, soaking, scouring, fleshing, tanning, bleaching, dyeing, fat-liquoring or oil finishing, etc. operations.

(12) In the paper industry and in the processing of viscose.

(13) In emulsion polymerization of synthetic rubber and polymers, for example in dispersing the prepolymerized materials in water or other liquid media, in creaming natural latex, the formation of plastic foam, in bonding polymers to fabrics and other materials, the dispersion of fillers and pigments into polymers, etc.

(14) In paints, for example, as an aid in grinding and dispersing pigments in prevention of settling and flooding, to promote adhesions and interfacial effects of paints and paint removers, as emulsifying and improving agents for emulsion paints and coatings.

(15) In primary petroleum recovery and drilling (a) In drilling muds as emulsifiers.
(b) As a wetting agent in primary production.
(c) In air drilling as foamer, desander, etc.
(d) To remove mud, wax, etc. from well bore.

(16) In secondary oil recovery (1) As wetting agents for acid treating and hydraulic fracturing.
(2) In water flooding to effect preferential wetting.

(17) As a demulsifier for petroleum for both W/O and O/W emulsions.

(18) As corrosion inhibitors.

(19) As scale inhibitors.

(20) As antiseptic, preservative, bactericidal, bacteriostat germicidal, fungicidal agents.

(21) As additives for fuel oil, for example as detergents, sludge-suspending agents, etc.

(22) As foaming agents, for example, in fire fighting foams, in air drilling, in desanding walls, in gas-lift wells.

(23) As general emulsifying agents for example in cosmetics, agricultural, paint, coating, flavoring oil, perfume oil, asphalt and bitumen, furniture and floor polishes, etc.

(24) As chelating agents.

(25) As anti-static agents.

(26) As deinking agents for printed material such as newspapers, etc.

(27) As flocculants, for example, in water purification, etc.

(28) Any other applicant which can make use of the properties of these compositions.

Having thus described my invention what I claim as new and desire to obtain by Letters Patent is:

1. The zwitterion reaction product formed by first reacting epichlorohydrin with an alkali metal salt of phosphorous acid, phosphoric acid, sulfurous acid or sulfuric acid to open the epoxy ring and then reacting said so-formed product containing the unreacted chlorine atom of epichlorohydrin with dimethyl dodecyl amine.

2. The zwitterion reaction product of claim 1 wherein the alkali metal salt is sodium hexametaphosphate.

References Cited by the Examiner

UNITED STATES PATENTS

| | | | |
|---|---|---|---|
| 2,469,683 | 5/1949 | Dudley et al. | 260—584 |
| 2,708,666 | 5/1955 | Carpenter | 260—309.6 |
| 2,941,003 | 6/1960 | Shokal | 260—584 |
| 2,957,003 | 10/1960 | Johnson | 260—309.6 |
| 3,017,357 | 1/1962 | Cyba | 252—32.5 |
| 3,017,362 | 1/1962 | Cyba | 252—51.5 |
| 3,029,265 | 4/1962 | Zech | 260—584 |
| 3,060,182 | 10/1962 | Zech | 260—309.6 |
| 3,201,441 | 8/1965 | Petersen et al. | 260—978 X |

CHARLES B. PARKER, *Primary Examiner.*

NICHOLAS RIZZO, *Examiner.*

NATALIE TROUSOF, RICHARD L. RAYMOND,
*Assistant Examiners.*